United States Patent [19]
Neiman

[11] Patent Number: 5,806,407
[45] Date of Patent: Sep. 15, 1998

[54] BEVERAGE MAKER

[75] Inventor: A. J. Neiman, Whittier, Calif.

[73] Assignee: Galaxy Tea Corporation, Santa Fe Springs, Calif.

[21] Appl. No.: 954,713

[22] Filed: Oct. 20, 1997

[51] Int. Cl.⁶ .............................. A47J 31/00; H05B 1/02
[52] U.S. Cl. .............................. 99/281; 99/304; 99/307; 219/518; 126/350 R; 222/146.5
[58] Field of Search .............................. 99/281, 282, 304, 99/306, 307; 219/518; 126/350 D, 113, 350 R; 222/146.5, 146.2

[56] References Cited

U.S. PATENT DOCUMENTS

| | | | |
|---|---|---|---|
| 2,218,868 | 10/1940 | Bichon | 219/518 X |
| 4,360,128 | 11/1982 | Neumann | 99/281 X |
| 5,693,244 | 12/1997 | Pragt et al. | 219/518 X |

Primary Examiner—Reginald L. Alexander

[57] ABSTRACT

A beverage maker employs an electrically operated boiler having a hot water output and a cold water input. Electric power is supplied through a normally open micro switch to the boiler. The boiler is actuated to produce heat only when the switch is closed and is deactuated and produces no heat when the switch is open. A water reservoir is disposed above the boiler and above the switch. The reservoir has a water input port at the top of the reservoir and a water output port at the bottom of the reservoir. A water feed hose connects the output port of the reservoir through a one way valve to the cold water input of the boiler whereby water can flow by gravity out of the reservoir into the boiler but cannot flow out of the boiler into the reservoir. A counter balancing mechanism is secured to the reservoir to maintain the reservoir in raised position above the switch when the reservoir is empty whereby the switch is open and the boiler is deactuated. The mechanism, when the reservoir is filled with water, causes the reservoir to descend and engage and close the switch and actuate the boiler, hot water being discharged from the boiler through the hot water output.

8 Claims, 1 Drawing Sheet

BEVERAGE MAKER

BACKGROUND OF THE INVENTION

Many beverage makers known in the art for brewing coffee, tea or the like introduce cold water into an electrically heated boiler and deliver the hot water produced by the boiler into a container in which the material to be brewed is disposed, thus producing the brewing action. The present invention is directed toward a beverage maker of this type.

In contradistinction to known beverage makers, the present invention eliminates the use of a separate on-off switch; it consumes no measurable current except when brewing; and it employs no electronics. Moreover, it employs a unique counterbalanced water reservoir in providing the brewing action.

SUMMARY OF THE INVENTION

In accordance with the principles of this invention, the beverage brewer utilizing a housing which contains the following components: an electrically operated boiler having a hot water output and a cold water output; first means including a normally open micro switch for supplying electric power to said boiler, said boiler being actuated to produce heat only when the switch is closed and being deactuated and producing no heat when the switch is open; a water reservoir disposed above the boiler and above said switch, said reservoir having a water input port at the top of the reservoir and a water output port at the bottom of the reservoir; second means including a one way valve connecting the output port of the reservoir to the cold water input of the boiler whereby water can flow by gravity out of the reservoir into the boiler but cannot flow out of the boiler into the reservoir; and a counter balancing mechanism secured to said reservoir to maintain the reservoir in raised position above the switch when the reservoir is empty. The second means includes a hose for feeding water out of the reservoir and into the boiler.

Thus, the beverage maker contains no separate on-off switch; the micro switch is mechanically actuated without any electronic controls; and no electric power is consumed except when the boiler is actuated.

In order to prevent formation of undesirable lime deposits in the boiler and also to prevent actuation of the boiler when no water is retained therein, the counterbalance mechanism can be adjusted to hold the reservoir in raised position while retaining some water before the boiler is actuated. in order for the reservoir to retain some water under these conditiones, the hose must remain filled with water and some water must be retained in the boiler. While the boiler retains water, the lime deposits cannot form and the boiler can never be actuated while it is dry.

These and other advantages of this invention will either be explained or will become apparent hereinafter.

BRIEF DESCRIPTION OF THE DRAWING

The accompanying Figure illustrates a preferred embodiment of the invention.

DETAILED DESCRIPTION OF PREFERRED EMBODIMENT

Figure 1:
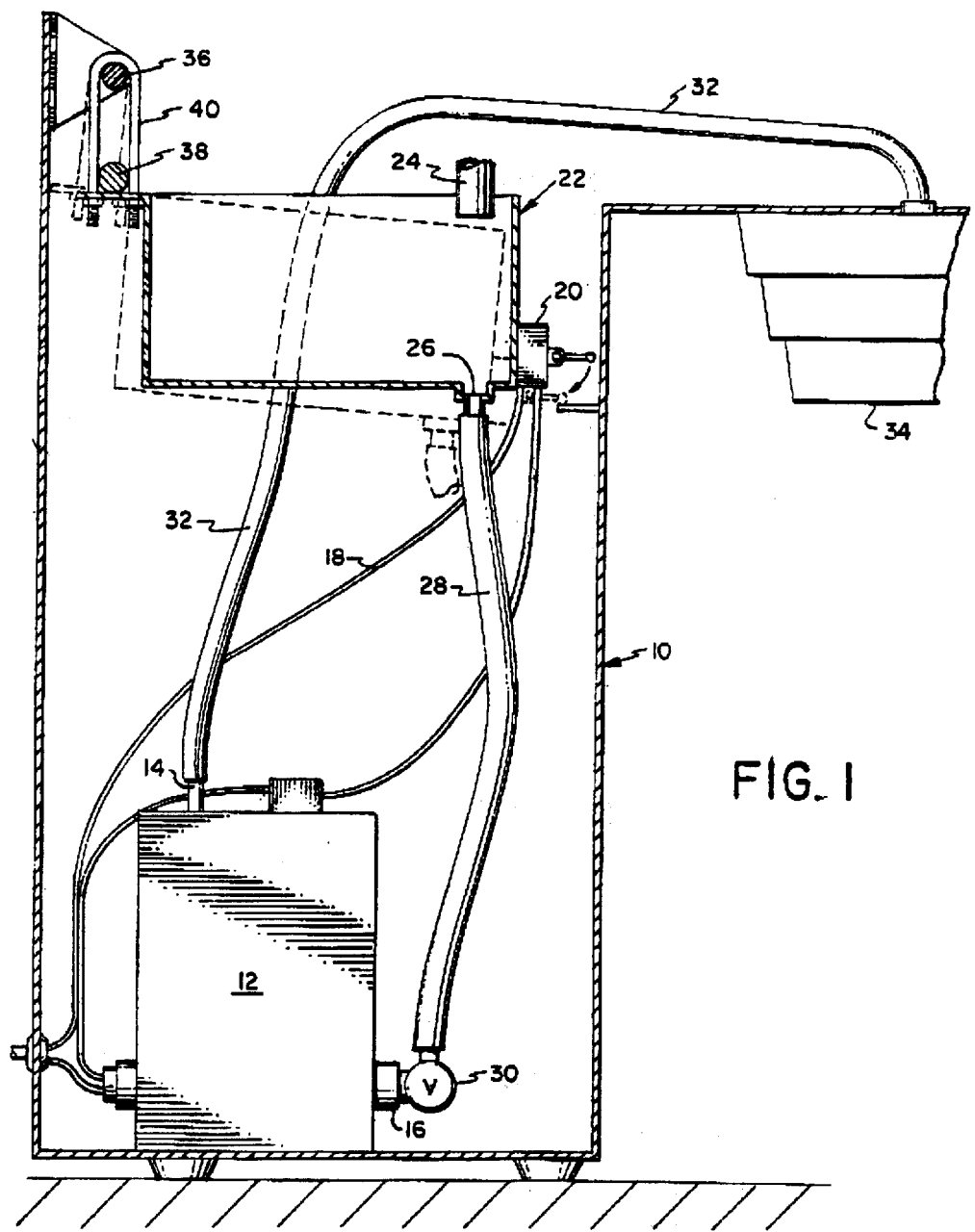

Referring now to the Figure, the beverage maker employs a housing 10. Disposed in the housing is an electrically operated boiler 12 having a hot water output 14 and a cold water output 16.

First means 18 including a normally open micro switch 20 supplies electric power to the boiler. The boiler is actuated to produce heat only when the switch is closed and is deactuated and produces no heat when the switch is open.

A rectangular water reservoir 22 is disposed in the housing above the boiler and above the switch. The reservoir has a water input port or opening 24 at the top of the reservoir and a water output port 26 at the bottom of the reservoir;

Second means including a hose 28 which connects the output port of the reservoir through a one way valve 30 to the cold water input of the boiler. Water can flow by gravity out of the reservoir into the boiler but cannot flow out of the boiler into the reservoir.

A counter balancing mechanism is secured to said reservoir to maintain the reservoir in raised position above the switch when the reservoir is empty whereby the switch is open and the boiler is deactuated. This mechanism when the reservoir is filled with water, causes the reservoir to descend and engage and close the switch and actuate the boiler, hot water being discharged from the boiler through the hot water output.

The hot water is carried through a second hose 32 to a funnel 34 which contains material such as tea, coffee and the like whereby brewing takes place in the funnel. The brewed material can be fed out of the funnel to a cup or other suitable container.

The mechanism includes horizontal support rods 36 secured in fixed position in the housing, adjacent but spaced from the opposite ends of the reservoir and elongated horizontal counter weights 38 disposed below the rods. U shaped loops 40 each of which has two opposite ends, are employed with each rod and weight. One end of each loop is secured to a weight and the other end of each loop is secured to the reservoir. The portion of each loop between the two ends loops over and slidably engages a rod.

Thus as the weight of water in the reservoir is increased or decreased, the weights and reservoir move relative to each other with respect to the fixed rods.

As explained previously, the mechanism can be adjusted so that the reservoir contains a small amount of water, which also fills the hose 28 and deposits a small amount of water in the boiler, and yet is held in raised position. Under these conditions, the switch remains open and the boiler is deactuated.

While the invention has been described with particular reference to the Figure and the preferred embodiment, the protection solicited is to be limited only by the terms of the claims which follow.

What is claimed is:

1. A beverage maker comprising:
    an electrically operated boiler having a hot water output and a cold water input;
    first means including a normally open micro switch for supplying electric power to said boiler, said boiler being actuated to produce heat only when the switch is closed and being deactuated and producing no heat when the switch is open;
    a water reservoir disposed above the boiler and above said switch, said reservoir having a water input port at the top of the reservoir and a water output port at the bottom of the reservoir;
    second means including a one way valve connecting the output port of the reservoir to the cold water input of the boiler whereby water can flow by gravity out of the reservoir into the boiler but cannot flow out of the boiler into the reservoir; and
    a counter balancing mechanism secured to said reservoir to maintain the reservoir in raised position above the switch when the reservoir is empty whereby the switch is open and the boiler is deactuated, said mechanism, when the reservoir is filled with water, causing the reservoir to descend and engage and close the switch and actuate the boiler, hot water being discharged from the boiler through the hot water output.

2. The maker of claim 1 wherein said mechanism is adjusted to permit the reservoir to retain a small amount of water when the reservoir is in raised position.

3. The maker of claim 2 wherein said second means includes a first feed hose.

4. The maker of claim 3 wherein when the reservoir is in raised position and retains a small amount of water, the hose is filled with water and a small amount of water is contained in the boiler.

5. The maker of claim 4 further including a funnel to receive material to be brewed as well as hot water to brew the material, said maker including a second feed hose connecting the hot water output of the boiler to said funnel to supply hot water thereto.

6. The maker of claim 1 including a housing for the reservoir, boiler, switch, mechanism and said second means.

7. The maker of claim 6 wherein said mechanism includes horizontal support rods secured in the housing, counter weights disposed below the rods, and U shaped loops, each of which has two opposite ends, one end being secured to a weight and the other end secured to the reservoir, the portion between the two ends looping over and slidably engaging a rod.

8. The maker of claim 7 wherein said reservoir has a rectangular shape with two opposite ends, said rods, weights and loops being disposed at each of the opposite ends of the reservoir.

\* \* \* \* \*